(12) United States Patent
Peters et al.

(10) Patent No.: US 10,865,890 B2
(45) Date of Patent: Dec. 15, 2020

(54) CONTROL VALVE (71) Applicant: Schwäbische Hüttenwerke Automotive GmbH, Aalen-Wasseralfingen (DE)

(72) Inventors: Sven Peters, Bad Schussenried (DE); Andreas Scheidemann, Ulm (DE); Lothar Preisler, Bad Schussenried (DE)

(73) Assignee: SCHWÄBISCHE HÜTTENWERKE AUTOMOTIVE GMBH (DE)

( * ) Notice: Subject to any disclaimer, the term of this patent is extended or adjusted under 35 U.S.C. 154(b) by 161 days.

(21) Appl. No.: 15/997,783

(22) Filed: Jun. 5, 2018

(65) Prior Publication Data
US 2018/0355986 A1 Dec. 13, 2018

(30) Foreign Application Priority Data

Jun. 8, 2017 (DE) .......................... 10 2017 112 700

(51) Int. Cl.
*F16K 11/07* (2006.01)
*F16K 31/122* (2006.01)
(Continued)

(52) U.S. Cl.
CPC ........ *F16K 11/0716* (2013.01); *F04B 49/002* (2013.01); *F04B 49/08* (2013.01);
(Continued)

(58) Field of Classification Search
CPC ........ F04B 49/08; F04B 49/002; F04B 49/03; F04B 49/22; F04B 49/225; F04B 49/24;
(Continued)

(56) References Cited

U.S. PATENT DOCUMENTS 2,238,063 A * 4/1941 Kendrick ................ F04B 49/00
417/213
4,420,935 A * 12/1983 Kobald .................... F16H 61/42
60/427
(Continued)

FOREIGN PATENT DOCUMENTS

CN         105090141 A      11/2015
DE         102 47 665 A1    7/2004
DE    10 2012 218 930 A1    4/2014

OTHER PUBLICATIONS

European search report dated Oct. 23, 2018 in corresponding application No. EP18176882.1.
(Continued)

*Primary Examiner* — David Colon-Morales
(74) *Attorney, Agent, or Firm* — Massina Pat & TM Law PLLC (57) ABSTRACT

A control valve including: a valve housing including a piston space; and a control piston which is movably arranged in the piston space and sub-divides the piston space into at least a first valve space and a second valve space, the control valve including at least a leakage path which sets a desired leakage between the first valve space and the second valve space. A motor vehicle device including an adjustable rotary pump including an adjusting means, for adjusting a delivery volume of the rotary pump, and the control valve, using which a pressure for adjusting the adjusting means can be governed, the motor vehicle device including a means which presses the control piston into a first position and holds it there, and the at least one other inlet of the control valve is connected to a high-pressure side of the rotary pump when the rotary pump is in operation.

21 Claims, 4 Drawing Sheets (51) Int. Cl.
    *F04B 49/00* (2006.01)
    *F04B 49/24* (2006.01)
    *F04B 49/08* (2006.01)
    *F04B 49/22* (2006.01)
    *F16K 17/10* (2006.01)
    *G05D 16/16* (2006.01)

(52) U.S. Cl.
    CPC .............. *F04B 49/22* (2013.01); *F04B 49/24* (2013.01); *F16K 11/07* (2013.01); *F16K 17/105* (2013.01); *F16K 31/1221* (2013.01); *G05D 16/166* (2013.01); *Y10T 137/8671* (2015.04)

(58) Field of Classification Search
    CPC ...... F04B 49/243; F04B 49/246; F16K 11/07; F16K 11/0708; F16K 11/0716; F16K 17/105; F16K 17/10; F16K 31/1221; F04C 14/24; Y10T 137/85986; Y10T 137/86002; Y10T 137/8601; Y10T 137/86019; Y10T 137/86027; Y10T 137/8663; Y10T 137/8671
    See application file for complete search history.

(56) References Cited

U.S. PATENT DOCUMENTS

| | | | | |
|---|---|---|---|---|
| 4,528,814 A * | 7/1985 | Stuhr | ............... | F04B 49/002 60/419 |
| 4,674,956 A * | 6/1987 | Dantlgraber | ............ | F04B 49/08 417/220 |
| 5,515,829 A * | 5/1996 | Wear | ............... | F02B 75/22 123/446 |
| 6,179,570 B1 * | 1/2001 | Smith | ............... | F04B 49/002 417/212 |
| 6,688,862 B2 * | 2/2004 | Jeronymo | ............ | F04C 14/226 418/26 |
| 7,018,178 B2 * | 3/2006 | Hunter | ............ | F01M 1/16 123/196 R |
| 7,044,442 B2 * | 5/2006 | Belser | ............... | F04B 49/002 251/176 |
| 7,555,899 B2 * | 7/2009 | Maier | ............... | F04B 49/002 60/452 |
| 7,607,297 B2 * | 10/2009 | Moya | ............... | F04B 49/002 60/452 |
| 7,975,599 B2 * | 7/2011 | Geissler | ............ | F04B 49/002 91/504 |
| 9,399,985 B2 * | 7/2016 | Sewcz | ............... | F04B 49/22 |
| 2005/0005599 A1 * | 1/2005 | Schmid | ............... | F04B 49/002 60/445 |
| 2006/0043787 A1 | 3/2006 | Maier et al. | | |
| 2009/0139395 A1 | 6/2009 | Messerlie et al. | | |
| 2010/0028171 A1 * | 2/2010 | Shulver | ............... | F01M 1/16 417/307 |
| 2013/0209302 A1 * | 8/2013 | Ono | ............... | F04C 2/102 418/17 |
| 2014/0103233 A1 | 4/2014 | Sewcz et al. | | |
| 2016/0116059 A1 * | 4/2016 | Holtmann | ............ | F04C 14/24 418/23 |
| 2016/0363120 A1 * | 12/2016 | Meinig | ............... | F04C 14/24 |

OTHER PUBLICATIONS

Search Report from corresponding German Appln. No. 10 2017 112 700.3 dated Feb. 9, 2018.

Office Action from corresponding Chinese Appln. No. 201810587257 dated Oct. 24, 2019.

\* cited by examiner

CONTROL VALVE

This application claims priority to German Patent Application No. 10 2017 112 700.3, filed on Jun. 8, 2017, the contents of which are incorporated herein by reference.

FIELD OF THE INVENTION

The invention relates to a control valve, for example a control valve which is incorporated into a pump unit having an adjustable delivery rate, comprising a valve housing including a piston space and a control piston which is arranged in the piston space and sub-divides the piston space into at least a first and second valve space. At least a leakage path which sets a desired leakage between the first valve space and the second valve space is provided in the piston space. The invention also relates to a motor vehicle device comprising an adjustable rotary pump and the control valve, and to the control piston itself.

BACKGROUND OF THE INVENTION

The object of the invention is in particular to provide a control valve using which an improved governance of an assembly, in particular a rotary pump, is achieved, for example with respect to a throughflow volume of a medium delivered by the assembly and/or a tendency of a medium delivered by the assembly to vibrate.

SUMMARY OF THE INVENTION

This object is solved by the control valve, the motor vehicle device, the control piston and the retrofitting method described herein. Advantageous developments of the control valve and the motor vehicle device are further described.

A first aspect of the invention relates to a control valve comprising a valve housing which comprises a piston space. The valve housing preferably consists of one part, but can also be formed from two or more parts which are connected to each other. The valve housing can be manufactured in a casting method; alternatively, the valve housing can be produced generatively, i.e. in its broadest sense, by means of a sintering process and/or a 3D printing method. A metal or metal powder, such as for example steel, and/or a light metal, such as for example aluminium, and/or a plastic can be used as the material for the valve housing, depending on the site of installation of the control valve and the conditions prevalent at said site, such as temperature, aggressive substances, mechanical stress, etc.

At least in the case of a valve housing made of a casting material, it can be necessary to machine-finish the piston space and/or any inlets or outlets into or out of the piston space.

The control valve also comprises a control piston which is movably arranged in the piston space and sub-divides the piston space into at least a first valve space and a second valve space. The first valve space and second valve space are connected to each other via a first leakage path, wherein the first leakage path is an intended or design-specific leakage path which is not set by the tolerances of the components. The first leakage path sets a desired first leakage, i.e. a preferably predetermined or design-specific first leakage, between the first valve space and the second valve space. The expression "desired leakage" is in particular understood here to mean the amount of a fluid per unit time which is exchanged between the first valve space and the second valve space as a function of parameters such as the pressure of the fluid, the temperature of the fluid and/or environment, the viscosity of the fluid, the speed of movement of the piston, etc.

The control piston can preferably sub-divide the piston space into at least three valve spaces, wherein the first valve space and the third valve space immediately follow the second valve space on opposite sides, or the second valve space and the third valve space immediately follow the first valve space on opposite sides. In other words, the second valve space is arranged between the first valve space and the third valve space in the piston space, or the first valve space is arranged between the second valve space and the third valve space in the piston space. The third valve space is connected to the second valve space and/or to the first valve space via another leakage path, wherein a second leakage via the other or second leakage path is smaller than the first leakage via the first leakage path. The second leakage can be one which is unavoidable due to production tolerances, which in particular means that the first leakage has to be larger than the second leakage at a maximum possible tolerance between the valve housing and the control piston.

The control valve can comprise at least a first inlet which feeds into the first valve space in at least one position of the piston within the piston space. It can also comprise another or second inlet which feeds into the third valve space in at least one position of the piston. The control valve preferably comprises at least the first inlet and second inlet. The inlet or inlets can feed into the piston space on an end-facing side (each) or can be connected to the piston space between the two end-facing sides of the valve housing, to a certain extent from the side, through a lateral housing opening (each), such as for example a bore.

In order to sub-divide the piston space into the at least two or at least three valve spaces or valve chambers, an inner wall of the piston space or valve housing and an outer wall of the control piston each form a sealing gap, which separates adjacent valve spaces from each other, preferably at least in predetermined regions. This means for example in the case of three valve spaces that a sealing gap separates the first valve space from the second valve space, and another sealing gap separates the second valve space from the third valve space. The first leakage path can then for example extend through the sealing gap between the first valve space and the second valve space; the second leakage path can extend through the other sealing gap between the second valve space and the third valve space.

This means that in order to set the desired leakage via the first leakage path, the sealing gap between the first valve space and the second valve space is preferably embodied so as to be larger than the sealing gap between the second valve space and the third valve space and/or larger than the sealing gap between the first valve space and the third valve space. If the first valve space is arranged between the second valve space and another valve space, it also holds for the sealing gap between the first valve space and the second valve space and a sealing gap between the first valve space and the other valve space that the former preferably has to be embodied so as to be larger than the latter. The desired leakage is preferably realised by increasing the corresponding sealing gap, for example by reducing the outer diameter in the corresponding region of the control piston and/or by increasing the inner diameter in the corresponding region of the valve housing.

The control valve can also comprise an outlet which is connected, preferably directly, to a reservoir or the environment or a suction region of the assembly. The outlet can feed into the second valve space and is preferably connected to the reservoir or the environment or the suction region permanently, i.e. irrespective of the position of the control piston in the piston space. The inlet which feeds into the first valve space is preferably connected to a means which selectively connects the first valve space to the high-pressure side of the assembly or separates it from the high-pressure side. The inlet which feeds into the third valve space is preferably connected permanently to the high-pressure side of the assembly.

At least the first leakage path can for example be formed by a circumferential gap between the inner wall of the piston space or valve housing and the outer wall of the control piston in the region of the sealing gap which separates the first valve space from the second valve space. Alternatively, the outer wall of the control piston can comprise a structure in said region, via which the leakage from the first valve space into the second valve space can be predetermined. A structure can equally be introduced on the inner wall of the piston space or valve housing in the region which corresponds to a preferably maximum shifting path of said sealing gap between the first valve space and the second valve space within the piston space. The control piston can also comprise one or more passage openings in the region of the aforesaid sealing gap which connect the first valve space and the second valve space to each other, preferably directly. The valve housing can also comprise one or more passage openings which fluidically connect the first valve space, and/or the inlet which feeds into the first valve space, to the second valve space and/or the outlet which feeds into the second valve space, preferably directly. Other ways of connecting the two valve spaces are likewise encompassed if they enable a desired leakage from the first valve space into the second valve space to be established.

A ratio of the first or desired leakage to the second leakage should advantageously be at least 1.5:1 and particularly advantageously at least 2:1, i.e. the first leakage should be at least 1.5 times or advantageously at least 2 times larger than the second leakage. The second leakage can also be a desired leakage in the sense of the first leakage, wherein if the second leakage is a desired leakage within the meaning of this document, then the same holds for the second leakage path forming the second leakage as for the first leakage path. The control valve advantageously comprises at least two different leakages between the valve spaces. By embodying the control piston so as to exhibit the desired leakage, it is possible to realise a specific leakage of the volume flow via the first leakage path, past the control piston, into the corresponding valve space, and in particular onwards into the reservoir or environment or suction region.

The control piston can comprise three active surfaces which preferably exhibit different sizes, wherein one of the active surfaces is formed by the difference in area between the desired or first leakage and the second leakage, which can optionally likewise be a desired leakage. By embodying the control piston so as to exhibit the three active surfaces, it is possible to realise a specific leakage of the volume flow via the first leakage path, past the control piston, to an active surface. The active surfaces are preferably embodied as hydraulic active surfaces, wherein by way of a hydraulic fluid pressure acting on the respective active surface, a resultant adjusting force can respectively act on the control piston. The three active surfaces are advantageously orientated in the same direction, i.e. the adjusting forces acting on the active surfaces preferably all act in the same direction.

The control valve in accordance with the invention enables an increased spread of the governed pressure over the duty cycle to be achieved. This means for example that it is possible to achieve a 4% change in the duty cycle per bar instead of a 2% change in the duty cycle per bar. This for example improves the governability of a pump and reduces the tendency of a pumped fluid to vibrate.

A second aspect of the invention relates to a motor vehicle device comprising an adjustable rotary pump which comprises an adjusting means for adjusting a delivery volume of the rotary pump. The rotary pump comprises: a housing, a suction side comprising an inlet; a pressure side or high-pressure side comprising an outlet; a delivery chamber comprising a base and a lid; and at least one rotor which is movably mounted in the delivery chamber and, in co-operation with an inner circumferential wall of the delivery chamber, forms delivery cells for the fluid. The rotary pump can for example be an external gear pump, an internal gear pump, a vane cell pump or other known adjustable rotary pump.

The rotary pump is preferably embodied as a displacement pump. The rotary pump is advantageously embodied as a motor vehicle pump. The rotary pump is preferably embodied as a lubricant and/or coolant pump. It is advantageously provided for supplying an internal combustion engine and/or a transmission of a motor vehicle, in particular a passenger car, with working medium and/or lubricant and/or coolant. The lubricant and/or coolant is preferably embodied as a lubricating and/or cooling oil. The rotary pump can in principle also be provided for delivering an actuating agent for a transmission. The pump can in particular be an adjustable vane cell pump. Alternatively, however, it can also be an adjustable pendulum-slider pump or toothed ring pump or external gear pump.

The adjusting means preferably comprises an adjusting ring or adjusting piston which can be adjusted using a pressure fluid. In order to govern the pressure fluid or setting fluid, the motor vehicle device comprises a control valve such as has been described with respect to the first aspect, wherein the at least one other inlet of the control valve, via which fluid can flow into the piston space or, respectively, the third and optionally fourth valve space, is or can be connected to a high-pressure side of the adjustable rotary pump. The first valve space can be connected to a means for providing a variable governed pressure, which delivers fluid of differing pressure.

The control piston can be moved into—and held in—a first position by a means, for example a spring element or a drive. The first position is preferably the position in which the adjustable rotary pump can deliver a maximum of fluid. It is possible to throttle the rotary pump, against the force of the means, via the control valve.

A third aspect of the invention relates to the setting piston or control piston itself, i.e. the third aspect also relates to a piston, for a pre-existing control valve, which is provided with the desired leakage by being machine-finished or re-made, such that once the control piston has been changed or exchanged, the pre-existing control valve or, respectively, the spread of its governed pressure over the duty cycle has been altered in accordance with the proposal of the invention, in order for example to improve the governability of a pump and/or to reduce the tendency towards vibration in the pumped fluid. It should be explicitly mentioned here that the control piston of the third aspect has to be adapted to the respective control valve, which is a task which the person skilled in the art can accomplish without any inventive activity.

A fourth aspect of the invention relates to a retrofitting method for a control valve, in particular a control valve of a motor vehicle device comprising an adjustable rotary pump, which is provided for adjusting the rotary pump. In the retrofitting method in accordance with the invention, the control piston is replaced with a control piston in accordance with the invention or is embodied as a control piston in accordance with the invention by being machine-finished. Preferably, a leakage between two valve spaces is desirably or knowingly increased by machine-finishing the control piston. It can be machine-finished by for example grinding, drilling, embossing, milling, lasering, etc.

Features of the invention are also described in the aspects formulated below. The aspects are worded in the manner of claims and can substitute for them. Features disclosed in the aspects can also supplement and/or qualify the claims, indicate alternatives with respect to individual features and/or broaden claim features. They do not restrict the features described in the aspects to their literal sense as such, but can conversely indicate preferred ways of realising the respective feature. Bracketed reference signs refer to example embodiments of the invention which are illustrated below in figures. They do not restrict the features described in the aspects to their literal sense as such, but do conversely indicate preferred ways of realising the respective feature. Subject-matter for claims of further applications also in particular follows from the aspects.

Aspect 1. A control valve, comprising: a) a valve housing comprising a piston space; b) at least one inlet into the piston space; c) at least one outlet out of the piston space; d) a control piston which is movably mounted in the piston space; and e) optionally, a means which presses the control piston into a first position in the piston space and holds it there, f) wherein the control piston and an inner circumferential wall of the piston space together form a first sealing gap and at least a second sealing gap which form a first valve chamber and a second valve chamber and preferably a third valve chamber in the piston space, characterised in that g) the first sealing gap, which separates the first valve chamber from the second valve chamber, is embodied such that it forms a desired first leakage path, from the first valve chamber into the second valve chamber, which sets a first leakage, and h) the second sealing gap, which separates the third valve chamber from the second valve chamber, is embodied such that it forms a second leakage path—optionally, a desired second leakage path—from the third valve chamber into the second valve chamber, which sets a second leakage which is smaller than the first leakage.

Aspect 2. The control valve according to Aspect 1, wherein the first valve chamber and the third valve chamber are each connected to an inlet into the piston space.

Aspect 3. The control valve according to any one of the preceding aspects, wherein the second valve chamber is connected to an outlet out of the piston space, preferably permanently.

Aspect 4. The control valve according to any one of the preceding aspects, wherein a cross-section of the piston space is constant in a shifting region of the sealing gaps, and a diameter of the piston space is in particular equal in the shifting region of the sealing gaps.

Aspect 5. The control valve according to any one of the preceding aspects, wherein the control piston is disc-shaped in the region of the sealing gaps.

Aspect 6. The control valve according to any one of the preceding aspects, wherein the piston space in the shifting region of the sealing gaps is a bore which exhibits a circular bore diameter, and the regions of the control piston which form the sealing gaps are circular, wherein the region of the first sealing gap has a first diameter and the region of the second sealing gap has a second diameter which is larger or smaller than the first diameter.

Aspect 7. The control valve according to the preceding aspect, wherein the first diameter and the second diameter are smaller than the bore diameter.

Aspect 8. The control valve according to any one of the preceding aspects, wherein a leakage through the first sealing gap and a leakage through the second sealing gap have a ratio of at least 1:2.

Aspect 9. The control valve according to Aspect 3, wherein the second valve chamber is connected to a reservoir for a fluid or to the environment or to a suction region of a rotary pump.

Aspect 10. The control valve according to Aspect 2, wherein the first valve chamber is connected to a first pressure fluid source, and the second valve chamber is connected to a second pressure fluid source which is preferably different from the first pressure fluid source.

Aspect 11. The control valve according to any one of the preceding aspects, wherein the control valve is a control valve for an adjusting means of an adjustable delivery pump.

Aspect 12. The control valve according to any one of the preceding aspects, wherein the means is a spring element, preferably a spiral spring.

Aspect 13. The control valve according to the preceding aspect, wherein the control piston is embodied as a hollow cylinder on its side facing the spring element, and the spring element extends into the hollow cylinder.

Aspect 14. The control valve according to any one of the preceding aspects, wherein the control piston comprises a first, second and third active surface.

Aspect 15. The control valve according to the preceding aspect, wherein one of the active surfaces is predetermined by a difference in area between the regions of the control piston which form the first sealing gap and the second sealing gap.

Aspect 16. A control piston for a control valve according to any one of the preceding aspects, wherein the control piston can replace an original control piston of the control valve.

Aspect 17. A control valve (1), in particular for an adjustable rotary pump (6) of a motor vehicle, comprising: a) a valve housing (2) which comprises a piston space (3); and b) a control piston (4) which is movably arranged in the piston space (3) and c) sub divides the piston space (3) into at least a first valve space (R1) and a second valve space (R2), characterised by d) at least a leakage path (L1) which sets a desired leakage between the first valve space (R1) and the second valve space (R2).

Aspect 18. The control valve according to the preceding aspect, wherein the control piston (4) sub divides the piston space (3) into at least a third valve space (R3, R3'), wherein another leakage between the third valve space (R3) and the second valve space (R2) and/or between the third valve space (R3') and the first valve space (R1) is smaller than the desired leakage.

Aspect 19. The control valve according to Aspect 18, comprising at least an inlet (E1) which feeds into the first valve space (R1) in at least one position of the piston and/or at least another inlet (E2, E2') which feeds into the third valve space (R3, R3') in at least one position of the piston.

Aspect 20. The control valve according to any one of the preceding aspects, wherein in order to sub divide the piston space (3), an inner wall of the valve housing (2) and an outer wall of the control piston (4) each form a sealing gap which separates the valve spaces (R1, R2, R3, R3', R4) from each other.

Aspect 21. The control valve according to the preceding aspect, wherein the leakage path (L1) extends through the sealing gap between the first valve space (R1) and the second valve space (R2).

Aspect 22. The control valve according to Aspect 20 or 21, wherein in order to set the leakage path (L1), the sealing gap between the first valve space (R1) and the second valve space (R2) is embodied so as to be larger than the sealing gap between the second valve space (R2) and the third valve space (R3) and/or larger than the sealing gap between the first valve space (R1) and the third valve space (R3').

Aspect 23. The control valve according to any one of the preceding aspects, wherein the second valve space (R2) is connected, preferably permanently, to an outlet (O1).

Aspect 24. The control valve according to any one of the preceding aspects, wherein the leakage path (L1) is formed by—a gap between the inner wall of the piston space (3) and the outer wall of the control piston (4) and/or—a structure 51 in the region of the outer wall of the control piston (4) which separates the first valve space (R1) from the second valve space (R2) and/or—a structure 52 on the inner wall of the piston space (3) in a shifting region of the leakage path (L1) and/or—at least one passage opening 53, in the control piston (4), which fluidically connects the first valve space (R1) to the second valve space (R2), preferably directly, and/or—at least one passage opening 54, in the valve housing (2), which fluidically connects the first valve space (R1), and/or the inlet (E1) which feeds into the first valve space (R1), to the second valve space (R2) and/or the outlet which feeds into the second valve space (R2), preferably directly.

Aspect 25. The control valve according to any one of the preceding aspects in combination with Aspect 18, wherein the other leakage between the third valve space (R3) and the second valve space (R2) and/or between the third valve space (R3') and the first valve space (R1) is a desired leakage via another leakage path (L2).

Aspect 26. The control valve according to any one of the preceding aspects in combination with Aspect 18, wherein the desired leakage via the leakage path (L1) is at least 1.5 times larger than the other leakage.

Aspect 27. The control valve according to Aspect 25 or 26, wherein the other leakage path (L2) is formed by—a gap between the inner wall of the piston space (3) and the outer wall of the control piston (4) and/or—a structure 51 in the region of the outer wall of the control piston (4) which separates the first valve space (R1) from the third valve space (R3') and/or—a structure 51 in the region of the outer wall of the control piston (4) which separates the second valve space (R2) from the third valve space (R3) and/or—a structure 52 on the inner wall of the piston space (3) in a shifting region of the other leakage path (L2) and/or—at least one passage opening 53, in the control piston (4), which fluidically connects the first valve space (R1) to the third valve space (R3'), preferably directly, and/or—at least one passage opening 53, in the control piston (4), which fluidically connects the second valve space (R2) to the third valve space (R3), preferably directly, and/or—at least one passage opening 54, in the valve housing (2), which fluidically connects the first valve space (R1), and/or the inlet (E1) which feeds into the first valve space (R1), to the third valve space (R3') and/or the inlet (E2') which feeds into the third valve space (R3'), preferably directly, and/or—at least one passage opening 54, in the valve housing (2), which fluidically connects the second valve space (R2), and/or the outlet which feeds into the second valve space (R2), to the third valve space (R3) and/or the inlet (E2) which feeds into the third valve space (R3), preferably directly.

Aspect 28. A motor vehicle device comprising an adjustable rotary pump (6) which comprises an adjusting means (7), for adjusting a delivery volume of the rotary pump (6), and a control valve (1) according to any one of aspects 1 to 27, using which a pressure for adjusting the delivery volume can be controlled or governed.

Aspect 29. The motor vehicle device according to the preceding aspect, wherein the first valve space (R1) of the control valve (1) can be connected to and separated from a high pressure side of the rotary pump (6) via a controlling means (9).

Aspect 30. The motor vehicle device according to Aspect 28 or 29, wherein the second valve space (R2) is permanently connected to a reservoir (10) or a suction side of the rotary pump (6).

Aspect 31. The motor vehicle device according to any one of aspects 28 to 30, wherein the third valve space (R3, R3') of the control valve (1) is permanently connected to a high pressure side of the rotary pump (6).

Aspect 32. A control piston for use in a control valve (1), wherein the control piston is the control piston (4) according to any one of aspects 1 to 33, exhibiting a desired leakage.

Aspect 33. A retrofitting method for a control valve, in particular a control valve of a motor vehicle device comprising an adjustable rotary pump (6), wherein the control valve comprises at least a control piston, characterised in that the control piston is replaced with a control piston (4) according to the preceding aspect or is embodied as a control piston (4) according to the preceding aspect by being machine finished.

Aspect 34. The control valve according to any one of the preceding aspects, characterised in that the leakage path (L1) enables a desired transition of fluid from the first valve space (R1) into the second valve space (R2).

Aspect 35. The control valve according to any one of the preceding aspects, characterised in that the control piston (4) comprises a first active surface (W1) and a second active surface (W2) and preferably another, third active surface, wherein the active surfaces (W1, W2, W3) are advantageously orientated in the same direction.

Aspect 36. The control valve according to any one of the preceding aspects in combination with Aspect 19, characterised in that the inlet (E1) which feeds into the first valve space (R1) is connected to a controlling means (9) which selectively connects the first valve space (R1) to a high pressure side of a pump or separates it from the high pressure side.

Aspect 37. The control valve according to any one of the preceding aspects, wherein the second valve space (R2) is connected, preferably permanently, to an outlet (O1) which is permanently connected to a reservoir (10), the environment or a suction region of a pump (6).

Aspect 38. The control valve according to any one of the preceding aspects in combination with Aspect 18, characterised in that the third valve space (R3, R3') of the control valve (1) is permanently connected to a high pressure side of a pump (6).

Aspect 39. The control valve according to any one of the preceding aspects, characterised in that the pressure in the first valve space (R1) is greater than or equal to the pressure in the second valve space (R2), wherein a force on the active surface (W2) of the control piston (4) towards the second valve space (R2) is produced in the first valve space (R1).

Aspect 40. The control valve according to any one of the preceding aspects, comprising a restoring means (5), preferably a valve spring (5), which acts counter to a fluid pressure prevailing in the first valve space (R1).

Aspect 41. The control valve according to any one of the preceding aspects in combination with Aspect 18, comprising a restoring means (5), preferably a valve spring (5), which acts counter to a fluid pressure prevailing in the third valve space (R3, R3').

Aspect 42. The control valve according to any one of the preceding aspects, wherein a fluid pressure prevailing in the first valve space (R1) exerts a control force, which acts in the movement direction of the control piston (4), on the control piston (4).

Aspect 43. The control valve according to the preceding aspect, wherein the control force acts against the restoring means (5) according to Aspect 40 or Aspect 41.

Aspect 44. The control valve according to any one of the preceding aspects in combination with Aspect 18, wherein a fluid pressure prevailing in the third valve space (R3, R3') exerts a control force, which acts in the movement direction of the control piston (4), on the control piston (4).

Aspect 45. The control valve according to the preceding aspect, wherein the control force acts against the restoring means (5) according to Aspect 40 or Aspect 41.

Aspect 46. The control valve according to any one of the preceding aspects, wherein the fluid is permanently applied to at least one of the first valve space (R1) and the third valve space (R3, R3') according to Aspect 18.

Aspect 47. The control valve according to any one of the preceding aspects, wherein the fluid pressure can be selectively applied via a controlling means (9) to at least one of the first valve space (R1) and the third valve space (R3, R3') according to Aspect 18.

Aspect 48. The control valve according to the preceding aspect, wherein the controlling means (9) is coupled to a superordinate controller 12, preferably an engine controller of an engine (8) of a vehicle, in order to either apply pressurised fluid to said at least one of the first valve space (R1) and the third valve space (R3, R3') or to relieve said at least one of the first valve space (R1) and the third valve space (R3, R3') of pressure, as a function of control signals of the superordinate controller.

Advantageous embodiments are also disclosed in the sub-claims and in the combinations of the sub-claims. Features essential to the invention which are only described with respect to one of the aspects of the invention also similarly apply to the other aspects wherever expedient.

BRIEF DESCRIPTION OF THE DRAWINGS

An example embodiment of the invention is described below on the basis of figures. Features disclosed by the example embodiment, each individually and in any combination of features, advantageously develop the subject-matter of the claims and the subject-matter of the aspects above and also the embodiments described at the beginning. There is shown:

DETAILED DESCRIPTION OF THE INVENTION

Figure 1:
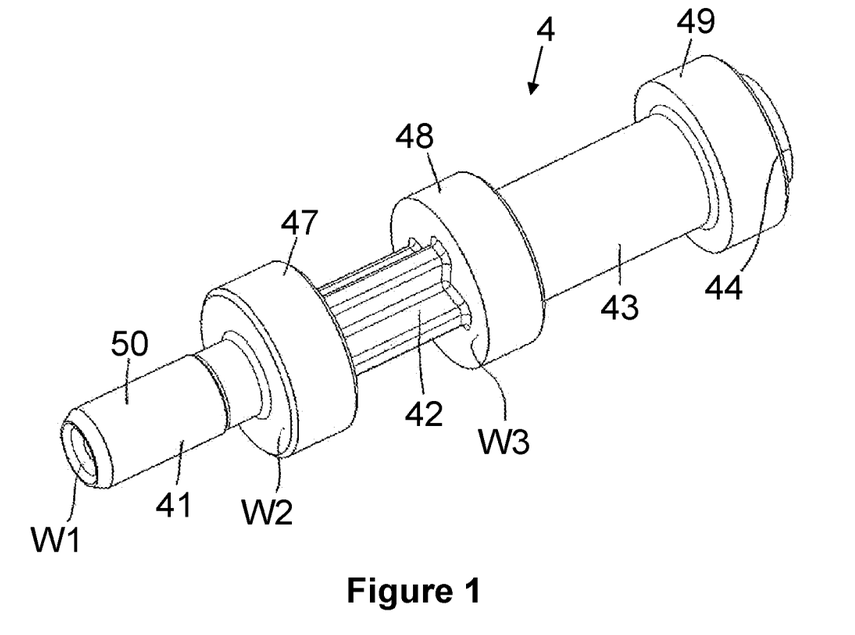
FIG. 1 shows a control piston of a control valve.

FIG. 1 shows, in isolation, an example embodiment of a control piston 4 for a control valve 1 (not shown). The control piston 4 comprises a first sealing portion 47, a second sealing portion 48 and a third sealing portion 49 which exhibit a diameter D1, D2, D3 which is larger than the diameters of the control piston 4 in front of, between and behind the sealing portions 47, 48, 49 in the first, second, third and fourth control piston portions 41, 42, 43, 44. The first sealing portion 47 and the second sealing portion 48 delineate the second control piston portion 42 in the axial direction of the control piston 4; the second sealing portion 48 and the third sealing portion 49 delineate the third control piston portion 43 in the axial direction. In this example embodiment, the control piston portion 41 likewise forms a sealing portion 50 exhibiting a diameter D4. The control piston 4 comprises a first active surface W1, a second active surface W2 and a third active surface W3. In this example embodiment, pressure fluid can only be applied to the first active surface W1 and the second active surface W2. The third active surface W3 is attached to an outlet, a reservoir or a suction side. It is in principle conceivable for pressure fluid to be able to be applied to all three active surfaces W1, W2, W3.

In accordance with the invention, the diameters D1, D2, D3 are different, i.e. at least one of the diameters D1, D2, D3 is smaller than one or more of the other diameters D1, D2, D3, such that if the control piston 4 is arranged in a piston space 3 exhibiting a diameter which is constant in a shifting region of at least two adjacent sealing portions 47, 48, 49 of the control piston 4, the sealing portion or portions 47, 48, 49 exhibiting the smaller diameter allow a desired or specific leakage, preferably through a permanently open leakage path L1, from one of the control piston portions 41, 42, 43, 44 into one of the adjacent control piston portions 41, 42, 43, 44. A desired leakage within the meaning of the invention can of course also be established when the diameter of the piston space 3 is different in regions of the sealing portions 47, 48, 49, 50.

In order to achieve the desired leakage, one or more of the sealing portions 47, 48, 49 can for example also solely or additionally comprise at least one groove on the outer circumference of the sealing portion or portions 47, 48, 49, a structure on the radially outer circumferential surface of the sealing portion or portions 47, 48, 49 which enables fluid to pass through, at least one passage bore or another fluid path for the desired leakage between two adjacent control piston portions 41, 42, 43, 44.

The subsequent figures show an example embodiment of a control valve 1 comprising a control piston 4 in accordance with FIG. 1. So as not to overburden the figures with reference signs, not all the reference signs from FIG. 1 are repeated. Where there is doubt, FIG. 1 may be adduced for better comprehension.

Figure 2:
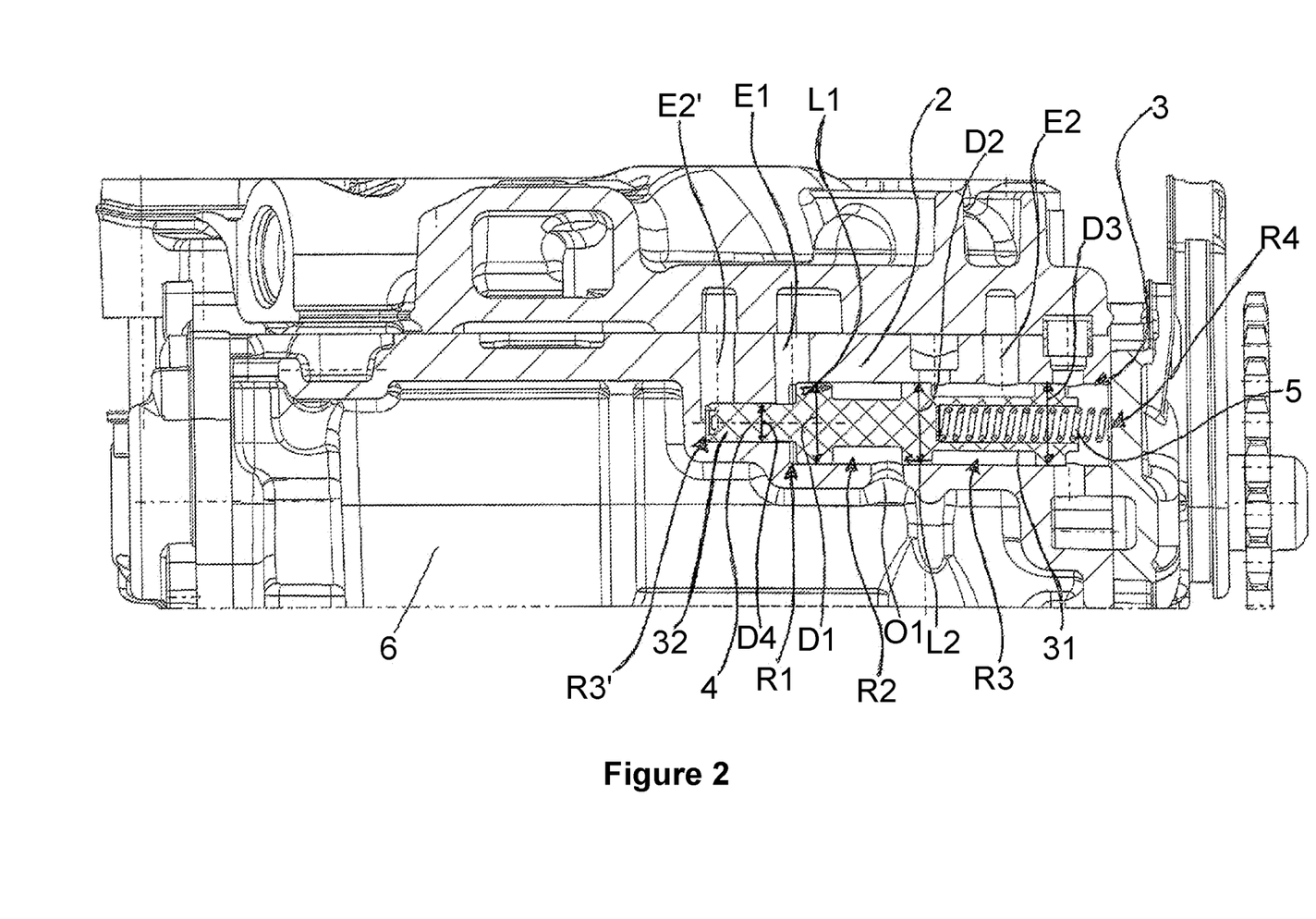
FIG. 2 is partially, a section through an adjustable rotary pump comprising a control valve which comprises a control piston in accordance with FIG. 1, wherein the rotary pump is at full delivery.

FIG. 2 shows a control valve 1 for controlling or governing an adjustable rotary pump 6 of a motor vehicle. The control valve 1 comprises a valve housing 2 and a piston space 3 in which the control piston 4 is mounted such that it can be shifted. In this example embodiment, a pump housing of the rotary pump 6 also forms the valve housing 2. In the example embodiment, the piston space 3 is formed from a first piston space portion 31 exhibiting a constant inner diameter, and a second piston space portion 32 exhibiting a constant inner diameter, wherein the inner diameter of the second piston space portion 32 is smaller than the inner diameter of the first piston space portion 31. With FIG. 1 in mind, the inner diameter of the first piston space portion 31 corresponds to the maximum diameter D1, D2, D3 of the sealing portion or portions 47, 48, 49.

The control valve 1 comprises a restoring means 5 which presses the control piston 4 into a first end position which it for example assumes when the rotary pump 6 is at a stop and in which the rotary pump 6 (which is only partially shown) is for example set to full delivery. In the example embodiment shown, the restoring means 5 is a spring element and/or valve spring 5 and advantageously a pressure spring in the form of a spiral spring. The control valve 1 comprises multiple inlets and outlets, of which however only those which are important to better understanding the invention are provided with reference signs and described in more detail in the following. The functionality of the control valve 1 is well known to the person skilled in the art, such that a detailed description is unnecessary.

The control valve 1 or, respectively, the piston space 3 is divided by the control piston 4 into five valve spaces R1, R2, R3, R3', R4 in the example embodiment shown. The valve spaces R3, R3' are permanently connected to a pressure side of the rotary pump 6 via the inlets E2 and E2', respectively. The valve space R2 is permanently connected to a reservoir 10 or the suction region of the rotary pump 6 via an outlet O1. The valve space R1 is connected to a fluid supply, via which fluid of differing pressure can be supplied, via the inlet E1. The valve space R1 can be connected up to the pressure side of the rotary pump 6. The pressure in the valve spaces R3' and R1 acts against the force of the restoring means 5 and can move the control piston 4 linearly within the piston space 3 towards the valve space R4 and hold it in a position assumed.

The first leakage path L1, which enables a desired transition of fluid from the valve space R1 into the valve space R2 and thus permanently connects the valve space R1, with throttle, to the outlet O1, is indicated in FIG. 2. The second leakage path L2, which—as already described in the general section—need not be a desired leakage path but can rather be formed solely by the permissible manufacturing tolerances, connects the valve space R3 to the valve space R2, wherein the leakage via the first leakage path L1 is larger than the leakage via the second leakage path L2. At least one and a half times as much fluid, preferably at least twice as much fluid, can flow from the valve space R1 into the valve space R2 via the first leakage path L1 as from the valve space R3 into the valve space R2 via the second leakage path L2, given the same operational conditions and the same time.

Figure 3:
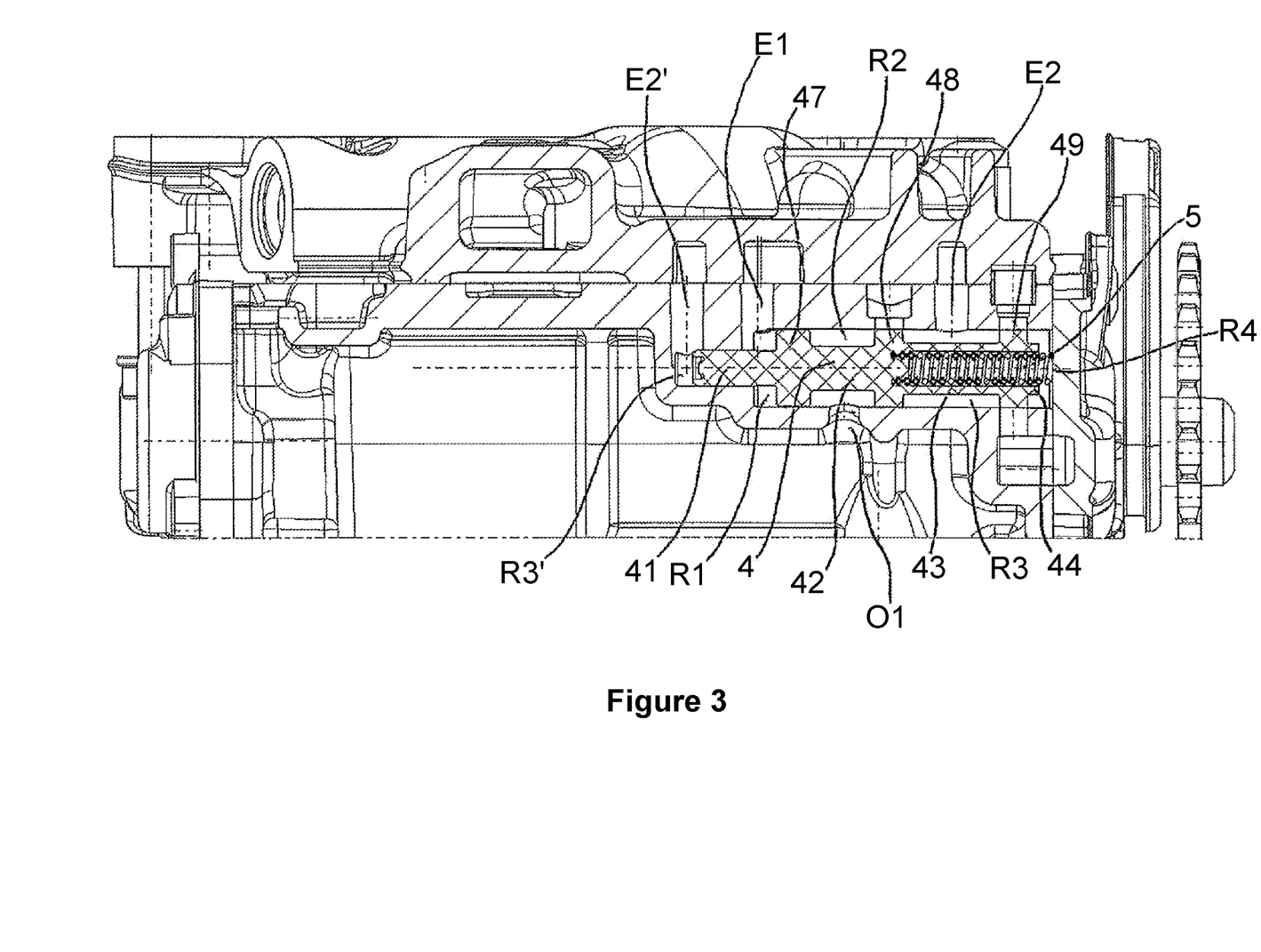
FIG. 3 is the section in FIG. 2, wherein the rotary pump is throttled.

FIG. 3 shows the control valve 1 comprising the control piston 4, in a second end position or just short of the second end position in which the restoring means 5 is maximally compressed by the pressure fluid flowing into the piston space 3. All other essential features to be read into the invention remain unaltered and need not therefore be repeated.

Figure 4:
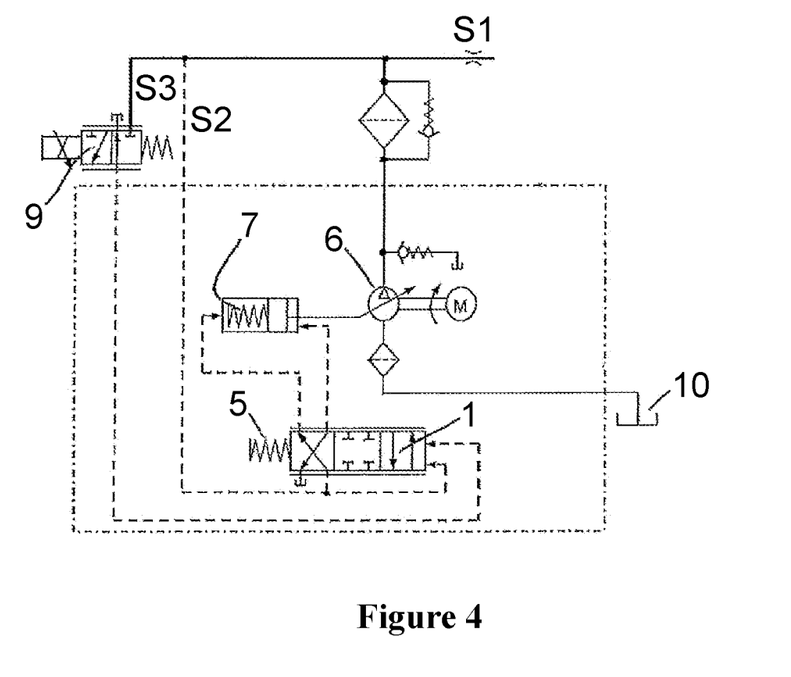
FIG. 4 is a schematic circuit diagram of a motor vehicle device comprising the adjustable rotary pump comprising the control valve.
Figure 4A:
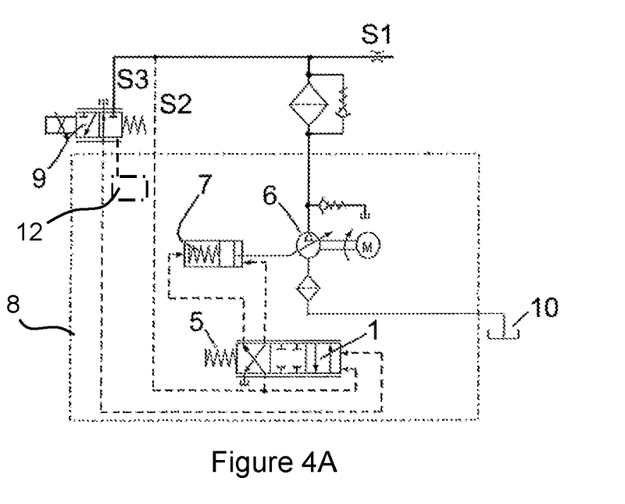
FIG. 4A is a schematic circuit diagram of an alternative motor vehicle device comprising the adjustable rotary pump comprising the control valve including a superordinate controller.
Figure 5A:
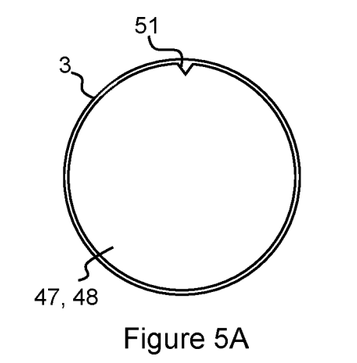
FIG. 5A is a cross-sectional view illustrating a structure in the region of the outer wall of the control piston.
Figure 5B:
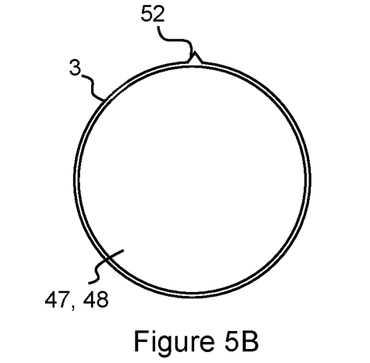
FIG. 5B is a cross-sectional view illustrating a structure on the inner wall of the piston space.
Figure 5C:
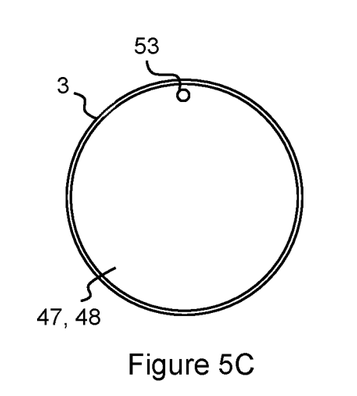
FIG. 5C is a cross-sectional view illustrating a passage opening in the control piston.
Figure 5D:
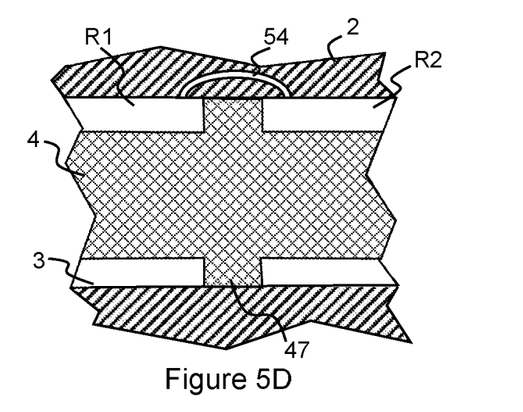
FIG. 5D is a cross-sectional view illustrating a passage opening in the valve housing.

FIG. 4 shows a schematic circuit diagram of a motor vehicle device comprising the adjustable displacement pump 6, for example a vane cell pump, pendulum-slider pump or an internal or external gear pump, comprising the control valve 1 and a controlling means 9 for controlling the control valve 1. The motor vehicle device is provided for lubricating and/or cooling an engine 8, preferably an internal combustion engine, or for supplying a transmission of the motor vehicle. The controlling means 9 is embodied as a magnetic valve. It is embodied as a PWM valve. The controlling means 9 sets a secondary pressure which acts on the adjusting means 7 of the rotary pump 6 via the control valve 1. The controlling means 9 connects the valve space R1 of the control valve 1 to the pressure side of the rotary pump 6 or separates the valve space R1 of the control valve 1 from the pressure side of the rotary pump 6.

A part of the pressure fluid is channeled from the pressure side of the pump 6 to a consumer (not shown) via a conduit S1 and flows partially via a conduit S2 directly to the control valve 1, where it flows into the valve spaces R3, R3' through the inlets E2 and E2'. Another part of the pressure fluid is channeled via the conduit S3 to the controlling means 9 which, when open, channels this part of the pressure fluid through the inlet E1 into the valve space R1 and, when closed, separates the pressure side of the rotary pump 6 from the inlet E1. An active surface for the pressure of the pressure fluid on the control piston 4 is therefore increased when the controlling means 9 is open, such that this pressure is greater than the pressure of the restoring means 5, thus enabling the control piston 4 to be moved from its first end position in FIG. 2 into its second end position in FIG. 3.

LIST OF REFERENCE SIGNS 1 control valve
2 valve housing
3 piston space
31 piston space portion
32 piston space portion
4 control piston
41 control piston portion
42 control piston portion
43 control piston portion
44 control piston portion
47 sealing portion
48 sealing portion
49 sealing portion
50 sealing portion
5 restoring means, valve spring
6 rotary pump
7 adjusting means
8 engine
9 controlling means
10 reservoir
D1 diameter
D2 diameter
D3 diameter
D4 diameter
W1 active surface
W2 active surface
W3 active surface
E1 inlet
E2 inlet
E2' inlet L1 leakage path
L2 leakage path
O1 outlet
R1 valve space
R2 valve space
R3 valve space
R3' valve space
R4 valve space
S1 conduit
S2 conduit
S3 conduit

The invention claimed is:

1. A control valve for an adjustable rotary pump of a motor vehicle, comprising:
   a valve housing which comprises a piston space; and
   a control piston which is movably arranged in the piston space and sub-divides the piston space into at least a first valve space and a second valve space,
   wherein at least one leakage path which sets a desired leakage between the first valve space and the second valve space is provided, and
   wherein the control piston sub divides the piston space into at least a third valve space, wherein another leakage between the third valve space and the second valve space and/or between the third valve space and the first valve space is smaller than the desired leakage.

2. The control valve according to claim 1, further comprising an inlet which feeds into the first valve space in at least a first position of the piston and/or an inlet which feeds into the third valve space in at least a second position of the piston, the second position of the piston may be the same or different than the first position.

3. The control valve according to claim 1, wherein in order to sub-divide the piston space, an inner wall of the valve housing and an outer wall of the control piston form a respective sealing gap which separates the valve spaces from each other.

4. The control valve according to claim 3, wherein the leakage path extends through the sealing gap between the first valve space and the second valve space.

5. The control valve according to claim 3, wherein in order to set the leakage path, the sealing gap between the first valve space and the second valve space is embodied so as to be larger than a sealing gap between the second valve space and the third valve space and/or larger than a sealing gap between the first valve space and the third valve space.

6. The control valve according to claim 1, wherein the second valve space is connected to an outlet.

7. The control valve according to claim 1, wherein the leakage path is formed by
   a gap between an inner wall of the piston space and an outer wall of the control piston, and/or
   a structure in the region of the outer wall of the control piston which separates the first valve space from the second valve space, and/or
   a structure on the inner wall of the piston space in a shifting region of the leakage path, and/or
   at least one passage opening, in the control piston, which fluidically connects the first valve space to the second valve space, and/or
   at least one passage opening, in the valve housing, which fluidically connects the first valve space, and/or the inlet which feeds into the first valve space, to the second valve space and/or the outlet which feeds into the second valve space.

8. The control valve according to claim 1, wherein the other leakage between the third valve space and the second valve space and/or between the third valve space and the first valve space is a desired leakage via a secondary leakage path defined between the respective valve spaces.

9. The control valve according to claim 1, wherein the desired leakage via the leakage path is at least 1.5 times larger than the other leakage.

10. The control valve according to claim 8, wherein the secondary leakage path is formed by
    a gap between an inner wall of the piston space and an outer wall of the control piston, and/or
    a structure in the region of the outer wall of the control piston which separates the first valve space from the third valve space, and/or
    a structure in the region of the outer wall of the control piston which separates the second valve space from the third valve space, and/or
    a structure on the inner wall of the piston space in a shifting region of the other leakage path, and/or
    at least one passage opening, in the control piston, which fluidically connects the first valve space to the third valve space, and/or
    at least one passage opening, in the control piston, which fluidically connects the second valve space to the third valve space, and/or
    at least one passage opening, in the valve housing, which fluidically connects the first valve space, and/or the inlet which feeds into the first valve space, to the third valve space and/or the inlet which feeds into the third valve space, and/or
    at least one passage opening, in the valve housing, which fluidically connects the second valve space, and/or the outlet which feeds into the second valve space, to the third valve space and/or the inlet which feeds into the third valve space.

11. The control valve according to claim 1, further comprising a restoring means which acts on the control piston counter to a fluid pressure prevailing in the first valve space.

12. The control valve according to claim 11, wherein the restoring means is a valve spring.

13. The control valve according to claim 1, further comprising a restoring means which acts on the control piston counter to a fluid pressure prevailing in the third valve space.

14. The control valve according to claim 1, wherein the fluid is permanently applied to at least one of the first valve space and the third valve space.

15. The control valve according to claim 1, wherein the fluid pressure can be selectively applied via a controlling means to at least one of the first valve space and the third valve space.

16. The control valve according to claim 15, wherein the controlling means is coupled to a superordinate controller in order to either apply pressurised fluid to said at least one of the first valve space and the third valve space or to relieve said at least one of the first valve space and the third valve space of pressure, as a function of control signals of the superordinate controller.

17. The control valve according to claim 16, wherein the superordinate controller is an engine controller of an engine of the vehicle.

18. A motor vehicle device comprising an adjustable rotary pump which comprises an adjusting means, for adjusting a delivery volume of the rotary pump, and the control valve according to claim 1, using which a pressure for adjusting the delivery volume can be controlled or governed.

19. The motor vehicle device according to claim 18, wherein the first valve space of the control valve can be connected to and separated from a high-pressure side of the rotary pump via a controlling means.

20. The motor vehicle device according to claim 18, wherein the second valve space is permanently connected to a reservoir or a suction side of the rotary pump.

21. The motor vehicle device according to claim 18, wherein the third valve space of the control valve is permanently connected to a high-pressure side of the rotary pump.

\* \* \* \* \*